Jan. 26, 1971     E. R. SCHRADER     3,559,130
SUPERCONDUCTIVE MAGNET AND METHOD OF CONSTRUCTING SAME
Filed Dec. 10, 1968
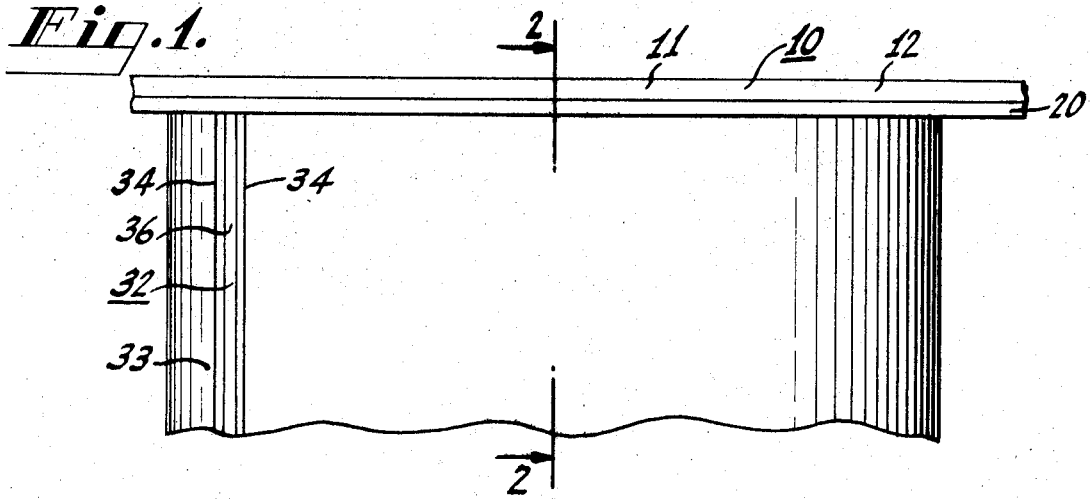
Fig. 1.
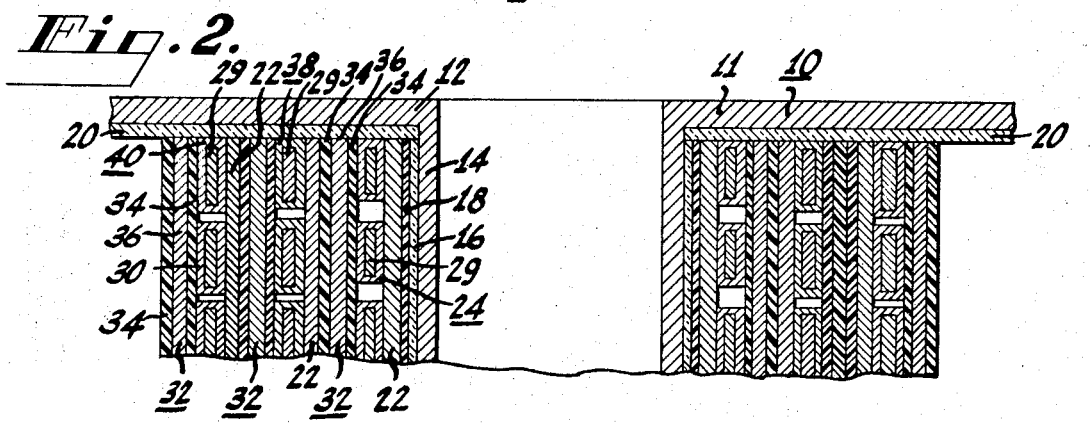
Fig. 2.
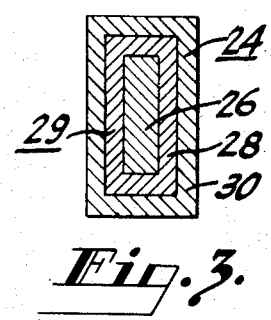
Fig. 3.
Fig. 4.
INVENTOR
EDWARD R. SCHRADER
BY Simon Yaffee
ATTORNEY United States Patent Office 3,559,130
Patented Jan. 26, 1971

3,559,130
SUPERCONDUCTIVE MAGNET AND METHOD OF CONSTRUCTING SAME
Edward R. Schrader, Hightstown, N.J., assignor to RCA Corporation, a corporation of Delaware
Filed Dec. 10, 1968, Ser. No. 782,673
Int. Cl. H01f 7/22
U.S. Cl. 335—216                         4 Claims

ABSTRACT OF THE DISCLOSURE

In superconductive magnets, the magnetic field within the body of the magnet varies from point to point. Superconductors with which the magnet is wound comprise a core which includes a superconductive material and a layer or coating of normal material surrounding the superconductive material for the purpose of stabilizing, to a greater or lesser degree, the superconductive magnet. Superconductive material resists penetration by an applied magnetic field and in doing so builds up local circulating currents which produce a field which opposes the applied field. The measure of opposition of a material to penetration by a magnetic field is called the magnetization of the material. The magnetization varies with the material, its geometry, and with the strength of the field applied to the material. It has been discovered that where the magnetization of the superconductive conductor with which the magnet is wound is the highest, the danger of a portion of the superconductor becoming normal is also highest. If a portion of the superconductor becomes normal, the entire magnet becomes normal unless the magnet is constructed so as to prevent this. A superconductive magnet and the method of making it is disclosed in which advantage is taken of this discovery to reduce the incidence of the magnet becoming normal due to circulating magnetization currents induced in the superconductor while resisting penetration by an applied magnetic field.

---

This invention relates to superconductive magnet construction.

A superconductive magnet may be constructed by winding a superconductor in a helical manner to provide a plurality of serially connected winding layers. The core of the superconductor may be of superconductive material or it may be of a superconductive material coated on a nonsuperconductive substrate. For various reasons, such as flux motion, a portion of the superconductor may be heated locally to above its critical temperature and become normal at the position where it is heated, whereby the entire superconductive magnet can become normal. Stabilizing means are known for reducing the incidence of the magnet becoming normal. Such means include using a superconductor the core of which is coated with conductive normal material, whereby a shunt is provided for the current flowing through the portion of the superconductor which has become normal long enough for the heat that caused the portion of the superconductor to become normal to be dissipated. The stabilizing means also include conductive interlayer sheets which tend to prevent flux motion, and also the stabilizing means may include provision for better circulation of the cryogenic fluid which provides a low temperature bath for the magnet. While it is possible to construct a completely stable superconductive magnet, the space taken up by the stabilizing means becomes so great that the completely stabilized magnet is too bulky for many uses. A partially stabilized magnet has a form factor which is higher than that of a fully stabilized magnet, where the form factor is defined as the ratio of the volume of the magnet used for carrying currents which were originally supplied to the magnet from a power supply to the entire volume of the magnet. If the magnet is partially stabilized and one superconductive portion thereof is more stable than another, the additional stability will be wasted since the magnet will go normal in other portions thereof. Therefore, in a partially stabilized magnet in which the degree of stabilization is uniform throughout the magnet, the form factor is greater than in a magnet which is not uniformly stabilized.

In accordance with this invention the stabilization of the magnet is rendered nearly uniform by properly choosing the material of and the amount of low electrical resistance non-superconductive coating on the superconductive core of a superconductor with which a magnet is wound so as to compensate for the lack of stability due to different magnetizations of the superconductor used to wind the magnet in different portions of the magnet wherein the superconductor is exposed to different fields. Also, where different superconductors are used in different portions of the magnet, the material or amount of low electrical resistance non-superconducting coatings or both on the various superconductors is so chosen as to compensate for different magnetizations of the different superconductors in the fields in which they are immersed.

The invention will be more readily understood upon reading the following description in connection with the accompanying drawing in which FIG. 1 is a partial elevational view of a partially completed superconductive magnet including an embodiment of this invention, FIG. 2 is a sectional view taken along the line 2—2 of FIG. 1, FIG. 3 is a cross sectional view of a superconductor of the type used in winding the magnet of FIGS. 1 and 2, and FIG. 4 is a group of curves that are useful in explaining the invention.

Referring first to FIGS. 1 and 2, a superconductive magnet 10 may be wound on a winding spool 11 having a flange 12 at each end thereof (only one flange 12 being shown) and a center tube 14. The spool 11 may be of any material which is sufficiently physically strong so as to act as a core for the superconductive magnet 10 to be wound thereon. The spool 11 is usually made of aluminum or stainless steel. As shown in FIG. 2, one or more layers of insulation 16 or 18 are placed on the tube 14. Also a layer of insulation 20 is provided on the inside surface of the flange 12.

Shorting bars 22 are laid on the insulation 18, these shorting bars being strips of copper or any other good normal conductor that does not become superconducting. The shorting bars are laid on the insulation 18 in such a direction that they each contact the turns of a layer of winding of a superconductive ribbon or conductor, to be described, in several places. As illustrated, the shorting bars 22 are laid on the insulation 18 in a direction parallel to the axis of the spool 11. The number of and cross sectional area of the bars 22 are chosen in a known manner so as to provide an alternate path for the current in a portion of a conductor when that portion of the conductor goes normal, until that portion of the conductor becomes superconductive again, thereby increasing the stability of the magnet. Yet, the cross sectional area of the bars must not be so great that they increase the time constant, that is the time it takes to build up the current in the superconductive magnet 10 to its rated value, to an excessively long period of time. A superconductive ribbon or conductor 24 is carefully wound in a helical manner from one end of the spool 11 to the other end thereof over the bars 22. The conductor 24 is wound at a uniform tension and in such a manner as to provide a uniform distance between adjacent edges of the several turns. A connection (not shown) is made to one end of the ribbon 24, this connection extending out beyond a flange 12. The ribbon 24 may comprise a stainless steel substrate 26, see FIG. 4, a layer 28 of superconductive material such as niobium stannide on the substrate 26 and a layer 30 of a normal conductor such as silver on the superconductor 28. Superconductors without an internal substrate are known. The reference character 29 in FIGS. 2 and 3 refers to the core of the superconductor 24 whether or not the core includes a substrate. For clarity of illustration in FIG. 2, the substrate 26 and the superconductor 28 are not separately shown but are combined as a core 29.

When a complete one conductor thick layer has been wound on the bars 22, a composite interlayer sheet 32 is wound around the completed layer. The interlayer sheet 32 comprises an insulating film 34, a sheet 36 of a conductor which remains normal at cryogenic temperatures and another insulating film 34. The interlayer sheet 32 extends more than 360 degrees whereby the end portions thereof overlap. However, the conductive sheet 36 does not provide a short circuited turn due to the fact that the overlying portions of the sheet 36 are insulated from each other by the insulating film 34. However, in certain circumstances, where the magnet energy is excessively large, the conductive sheets 36 may be formed into a shorted turn to provide dissipation of energy while the magnet is going normal. The interlayer sheet 32 acts in a known manner to make the superconductive magnet more stable in that the interlayer sheet 32 provides a path for heat from the superconductors to the cryogenic bath and also reduces the tendency of the flux in the superconductive magnet to jump.

More shorting bars 22 are positioned on the composite interlayer sheet 32 and another layer of superconductive ribbon 38 is wound in a helical manner on the bars 22. Then another composite interlayer sheet 32 is put on the superconductor 38 in an overlapping manner. Further bars 22 are laid on the last mentioned interlayer sheet 32 and another winding layer 40 in an overlapping manner. Further bars 22 are laid on the last mentioned interlayer sheet 32 and another winding layer 40 of superconductive ribbon is wound on the last mentioned bars 22, and this process is continued until the magnet is completed. While the overlap of the interlayer sheet 32 is not shown in FIG. 2, the overlap of the outside of the interlayer sheet 32 is shown in FIG. 1 at 33. In each winding layer, the cross sectional area of the superconductive portion of the ribbon 24 or 38 or 40 is chosen in a known manner to have the same current conducting capability even though the several layers of ribbon are exposed to different magnetic fields. Also, in each of the several winding layers, the thickness of the normal metal 30 is chosen, as will be explained below, to tend to equalize the stability of the various layers of the winding.

It is known that the greater the magnetic field to which a normal conductor is exposed, the less its conductivity both to heat and electrical currents. Therefore, for equalizing the stabilizing ability of the of the normal layer 30 on the several superconductive ribbons 24, 38 and 40 comprising different layers of the magnet where different magnetic fields are developed, it is necessary to increase the cross sectional area of the normal layer 30 and to increase the thickness of the copper sheet 36 portion of the interlayer sheet 32 in those portions of the magnet in which a higher magnetic field is developed over the respective thicknesses in the lower magnetic field portions of the magnet to compensate for different conductivity to heat and electricity of the normal metal in different portions of the magnet.

However, it has been discovered that another property of a superconductor, called the magnetization thereof, must be considered in determining the stabilizing effect of the normal layer 30 portion of the several superconductors 24, 38 and 40. A superconductor has the property of resisting penetration by a magnetic field. This property is exhibited by the superconductor since circulating currents are developed in the superconductor that is exposed to the magnetic field, these circulating currents themselves tending to produce a magnetic field that is equal and opposite in the surface layer of the superconductor to the applied field. The measure of the ability of a superconductor to resist penetration by a magnetic field is called its magnetization. As shown by the several curves A, B and C in FIG. 3, different superconductors can have different magnetizations for the same applied field. For all superconductive material however, the magnetization is zero at zero magnetic field, and goes up rapidly to a maximum for that material and then goes down more slowly as the magnetic field is increased. If the magnetization currents break down due to local instabilities or perturbations, the magnetic field which had up to that time been expelled from the superconductor, suddenly penetrates it. This flux motion generates an electric field which, in reacting with the currents in the conductor, produces power and therefore heat. The resulting rise in temperature can cause the superconductor to become normal, whereby all the current flowing therethrough is shunted to the normal metal layer on the superconductor, this layer acting as a shunt. If such a shunt is not provided, the magnet as a whole will go normal. If such a shunt of sufficient electrical and thermal capacity is provided, the normal portion may become superconductive again due to the cooling of the normal portion by the cryogenic bath before the complete magnet becomes normal. Therefore, the normal layer in the superconductor may be made thicker or otherwise be increased in electrical and thermal capacity to compensate for magnetic conduction decrease for the higher field currents in certain parts of the magnet, as is known and also, in accordance with this invention, the normal layer may be modified to increase its electrical and thermal capacity to compensate for greater magnetization of the superconductor in those parts of the magnet where the field is either greater or less in accordance with a magnetization curve of the superconductor with which the magnet is wound. The increase in electrical or thermal capacity may be attained by making the normal layer thicker, by using several layers of different normal metal or by tinning the superconductor and coating the tinned superconductor with copper, for example. The two effects (1) choosing the electrical and thermal capacity of the normal coating 30 to compensate for different magneto-resistive effects and different heat conductive effects in different portions of the magnet where the magnetic field is different, and (2) choosing the electrical and thermal capacity of the normal coating 30 to compensate for different magnetization of the superconductor at different portions of the magnet where the magnetic field is different, are additive. However, the two effects are contradictory in that over the whole range of magnetic fields, the magnetic effect on the resistance and the heat transfer of the normal coating 30 is proportional to the magnetic field, while over the greater extent of its useful range, the magnetization is an inverse function of the magnetic field. Therefore, when compensation is made for the two effects the normal coating 30 on the superconductor 24, 38 or 40 may be more nearly uniform throughout the several layers of the superconductive magnet 10 than if only one effect is compensated for. Also, since it may be convenient to wind different layers of the magnet with different superconductors having different magnetization curves, the different magnetization of the several superconductors must be considered in choosing the stabilizing effect of the layer of normal metal coating 30.

What is claimed is:

1. The method of building a superconductive magnet which comprises:

predetermining the magnetic field that will be developed at at least one point within the magnet when it is completed, predetermining the magnetization of a superconductor with which said portion of the magnet including said point will be wound, providing a superconductor having a normal coating on a superconductive core, the electrical and thermal capacity of said normal coating being chosen to compensate for the tendency of the portion of the superconductor at said point in the completed magnet to become normal due to circulating currents in the superconductor that tend to prevent flux penetration thereof, and winding the said portion of the superconductive magnet with said provided superconductor.

2. The invention as expressed in claim 1 in which said provided superconductor has a normal coating that will also compensate for the tendency of the superconductor with which said portion is wound to become normal at said point due to the decreased electrical and heat conductivity of said normal metal coating caused by the magnetic field at said point.

3. A superconductive magnet having a plurality of helically wound layers of superconductor, said layers being axially arranged, the outer layers being subjected to less magnetic field than the intermost layers, means for causing a field producing current to flow through said superconductor, said superconductor comprising a core and a layer of normal metal on said core, circulating currents appearing in said superconductive core to resist penetration of said core by said magnetic field, the material and cross sectional area of the normal metal on said core being chosen to provide a by-pass path for the circulating current in the adjacent portion of the core.

4. The invention as expressed in claim 3 in which in addition, the material and the cross sectional area of said normal layer is chosen not only to provide a by-pass path for said circulating currents but also to provide a by-pass path for said field producing current.

References Cited

UNITED STATES PATENTS 3,394,330   7/1968   Schindler _ _ _ _ _ _ _ _ _ _ _ 335—216

OTHER REFERENCES

Journal of Applied Physics, vol. 34, No. 4, pp. 1376–1377, April 1963, an article by Stekly et al.

GEORGE HARRIS, Primary Examiner

U.S. Cl. X.R.

335—299

UNITED STATES PATENT OFFICE
CERTIFICATE OF CORRECTION

Patent No. 3,559,130           Dated January 26, 1971

Inventor(s) Edward R. Schrader

It is certified that error appears in the above-identified patent and that said Letters Patent are hereby corrected as shown below:

Column 3, lines 38 - 40 delete "Further bars 22 are laid on the last mentioned interlayer sheet 32 and another winding layer 40 in an overlapping manner."

Column 3, line 58 delete "of the"

Signed and sealed this 6th day of July 1971.

(SEAL)
Attest:

EDWARD M. FLETCHER, JR.
Attesting Officer

WILLIAM E. SCHUYLER, J.
Commissioner of Patent